United States Patent
Ceruzzi

(10) Patent No.: US 9,327,544 B2
(45) Date of Patent: May 3, 2016

(54) STICK-ON STYLUS HOLDER

(71) Applicant: Alexander Ceruzzi, Canton, GA (US)

(72) Inventor: Alexander Ceruzzi, Canton, GA (US)

( * ) Notice: Subject to any disclaimer, the term of this patent is extended or adjusted under 35 U.S.C. 154(b) by 0 days.

(21) Appl. No.: 14/722,982

(22) Filed: May 27, 2015

(65) Prior Publication Data

US 2015/0343831 A1    Dec. 3, 2015

Related U.S. Application Data

(60) Provisional application No. 62/003,773, filed on May 28, 2014.

(51) Int. Cl.
*B43K 23/00*     (2006.01)
*F16B 2/22*      (2006.01)
*F16B 11/00*     (2006.01)
*G06F 1/16*      (2006.01)

(52) U.S. Cl.
CPC ............ *B43K 23/001* (2013.01); *F16B 2/22* (2013.01); *F16B 11/006* (2013.01); *G06F 1/1613* (2013.01); *Y10T 24/33* (2015.01)

(58) Field of Classification Search
None
See application file for complete search history.

(56) References Cited

U.S. PATENT DOCUMENTS

| 2,704,302    | A  | * | 3/1955  | Budd ........................ F16L 3/13 128/DIG. 26 |
| 7,385,596    | B2 |   | 6/2008  | Lin et al. |
| 7,623,121    | B2 |   | 11/2009 | Dodge |
| 2011/0285671 | A1 |   | 11/2011 | Wu et al. |
| 2013/0292530 | A1 |   | 11/2013 | Dang et al. |
| 2014/0029183 | A1 |   | 1/2014  | Ashcraft et al. |

* cited by examiner

*Primary Examiner* — Jack W Lavinder
(74) *Attorney, Agent, or Firm* — Dale J. Ream

(57) ABSTRACT

A stick-on stylus holder for receiving a stylus associated with an electronic device according to the present invention includes a stylus mounting member having opposed first and second ends and an elongate stylus mounting member extending therebetween. A pair of retaining members are mounted to a front side of said stylus mounting member proximate said first and second ends, respectively, each retaining member having a generally circular configuration that defines an open interior area. Each retaining member has a closed side coupled to said front side of said stylus mounting member and an open side facing away from said front side that is in communication with said open interior area and configured to selectively receive the stylus. A back side of said stylus mounting member includes an adhesive layer configured to adhere to an electronic device.

13 Claims, 4 Drawing Sheets

STICK-ON STYLUS HOLDER

REFERENCE TO RELATED APPLICATIONS

This application claims the benefit of provisional patent application U.S. Ser. No. 62/003,773 filed May 28, 2014 titled Stick On Stylus Holder which is incorporated herein by reference.

BACKGROUND OF THE INVENTION

This invention relates generally to stylus attachment devices and, more particularly, to a stylus holder that adhesively attaches to a portable electronic device for which the stylus is associated.

A stylus is a term that refers to a computer accessory that is used to enhance the navigation and precision of a touch screen interface. The stylus has a pointed tip that is easier to position on a touch screen input location than a person's finger which may be too large or imprecise. Unfortunately, the stylus—which is separate from the electronic device—often becomes separated or lost and, thus, not available to serve its purpose when needed.

Various devices have been proposed in the art for keeping a stylus in proximity to the electronic device with which it is associated, such as a tether or a holder integrated into the electronic device itself. Although presumably effective for their intended purposes, such devices are not easily installed on new electronic devices, are not available for aftermarket purchase, or are not useful to hold styluses of different sizes and shapes.

Therefore, it would be desirable to have a stylus holder that may be adhesively adhered to the side or front of a portable electronic device and which keeps a stylus immediately proximate the device when not in use. Further, it would be desirable to have a stylus holder that holds a stylus in a friction or pressure fit engagement for easy insertion or removal. In addition, it would be desirable to have a stylus holder that is configured to hold a stylus having a larger diameter, small diameter, or both at the same time.

SUMMARY OF THE INVENTION

A stick-on stylus holder for receiving a stylus associated with an electronic device according to the present invention includes a stylus mounting member having opposed first and second ends and an elongate stylus mounting member extending therebetween. A pair of retaining members are mounted to a front side of said stylus mounting member proximate said first and second ends, respectively, each retaining member having a generally circular configuration that defines an open interior area. Each retaining member has a closed side coupled to said front side of said stylus mounting member and an open side facing away from said front side that is in communication with said open interior area and configured to selectively receive the stylus. A back side of said stylus mounting member includes an adhesive layer configured to adhere to an electronic device.

Therefore, a general object of this invention is to provide a stick-on stylus holder that may be adhered directly to a surface of a portable electronic device such that the stylus is retained when not in use.

Another object of this invention is to provide a stick-on stylus holder, as aforesaid, which holds a stylus in a pressure or snap fit engagement for fast and easy access and stowage.

Still another object of this invention is to provide a stick-on stylus holder, as aforesaid, having a clamp configuration that selectively holds a larger-diameter stylus, a smaller-diameter stylus, or both.

Yet another object of this invention is to provide a stick-on stylus holder, as aforesaid, that is easy to use and economical to manufacture.

A further object of this invention is to provide a stick-on stylus holder, as aforesaid, that does not damage or change the electronic device to which it is adhered.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1A:
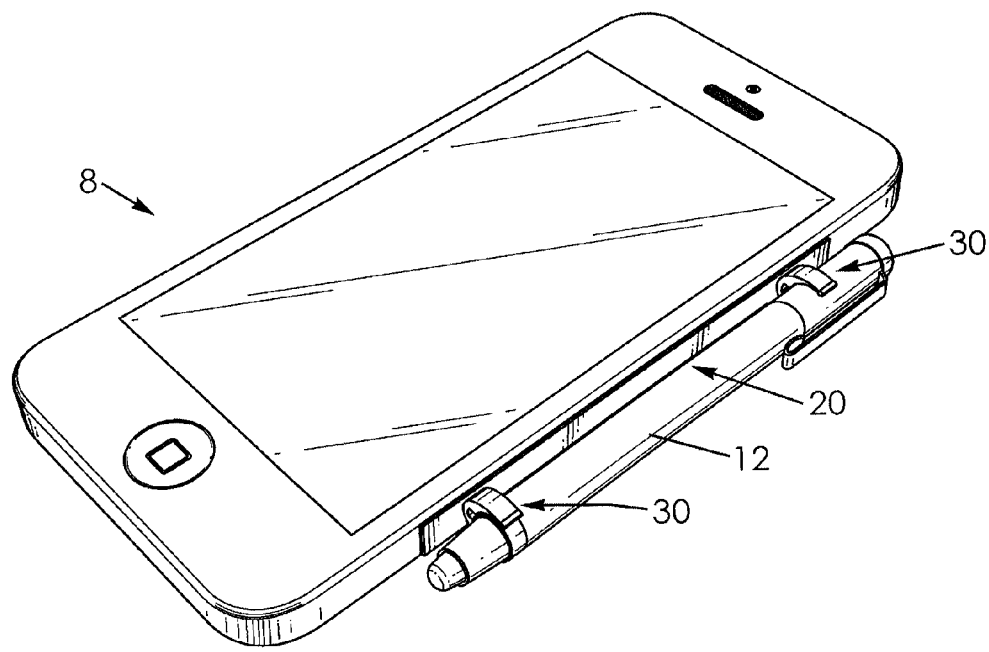
FIG. 1A is a perspective view of a stick-on stylus holder according to a preferred embodiment of the present invention in use mounted to a portable electronic device.
Figure 1B:
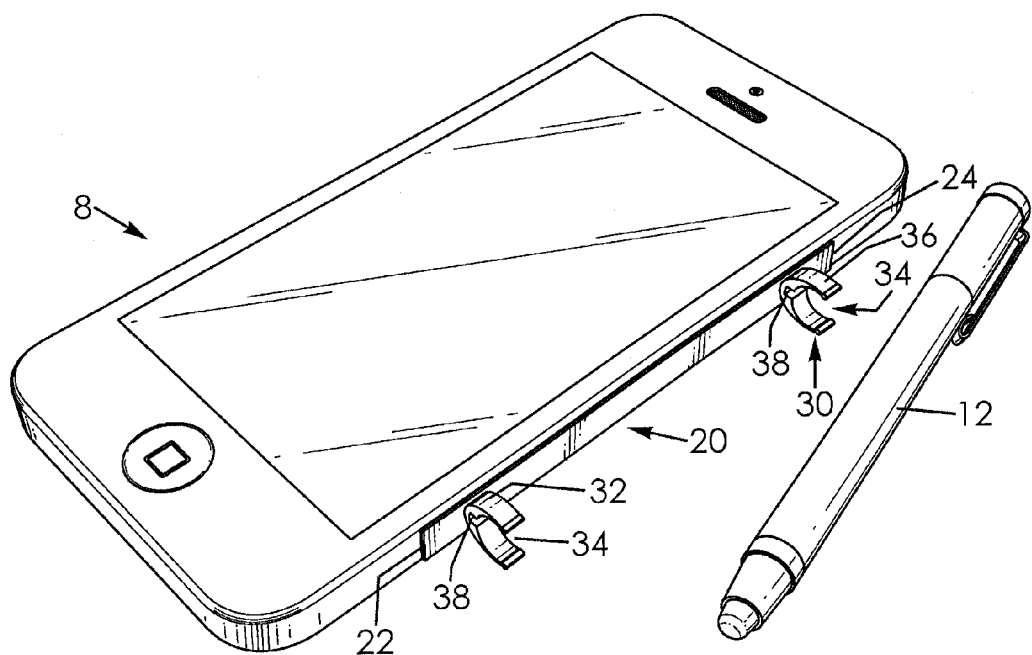
FIG. 1B is another perspective view of the stick-on stylus holder as in FIG. 1A with the stylus released from the stylus holder.
Figure 2:
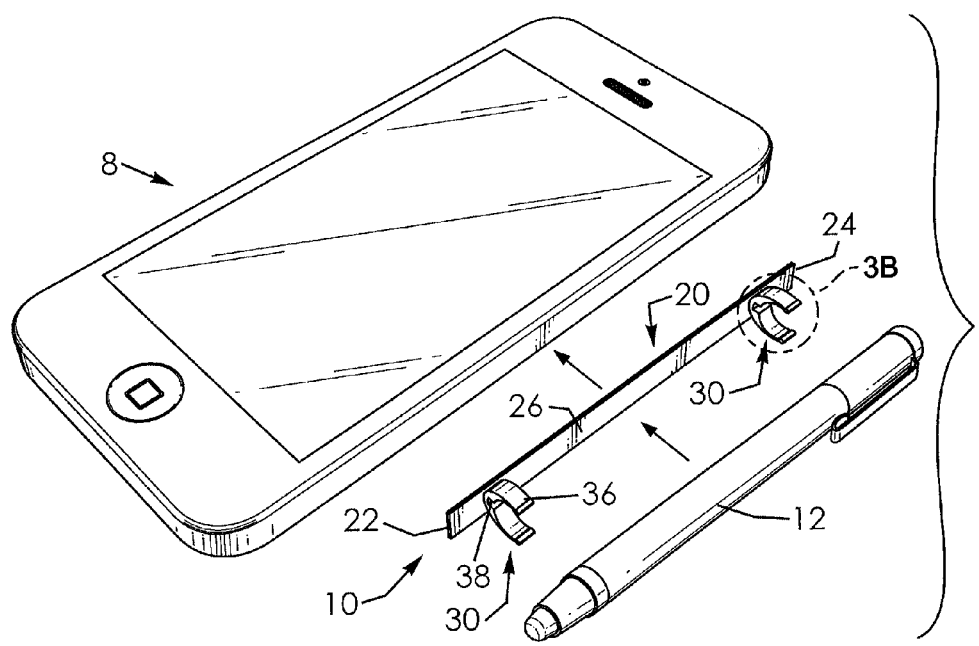
FIG. 2 is an exploded view of the stick-on stylus holder as in FIG. 1A.
Figure 3A:
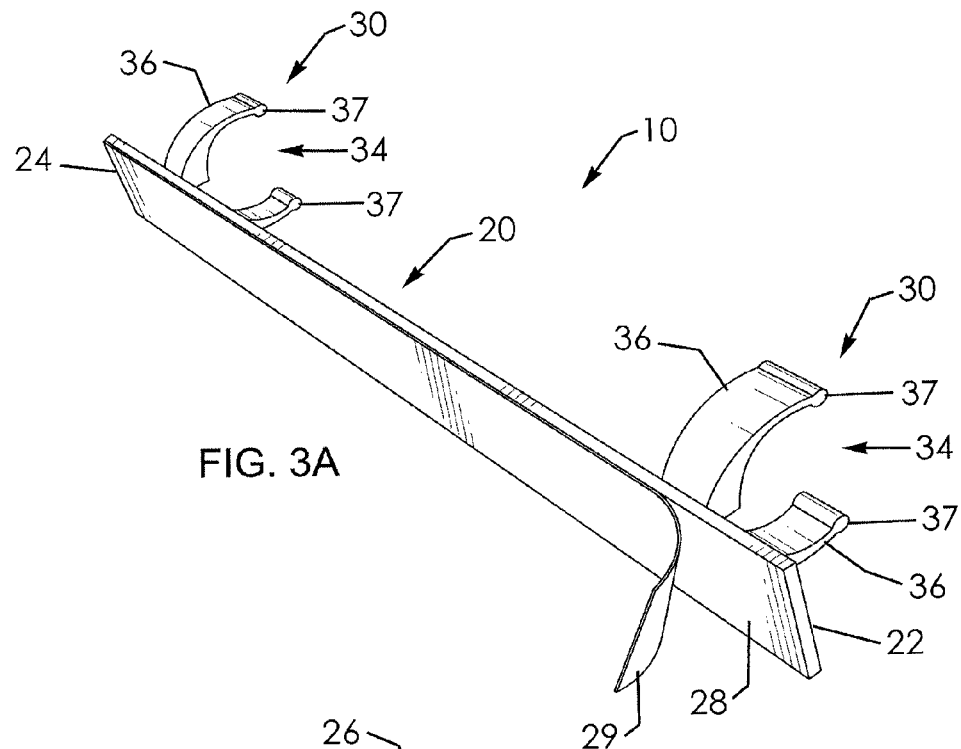
FIG. 3A is a rear perspective view of the stick-on stylus holder removed from the electronic device.
Figure 3B:
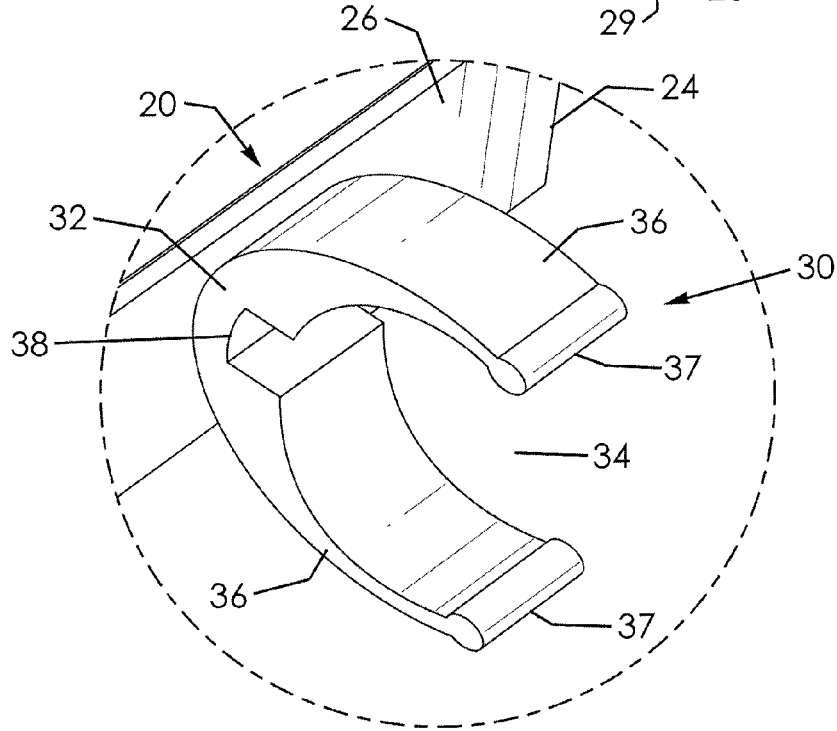
FIG. 3B is an isolated view on an enlarged scale taken from FIG. 2.

A stick-on stylus holder according to exemplary embodiments of the present invention will now be described with reference to FIGS. 1A to 4 of the accompanying drawings. The stick-on stylus holder 10 includes a stylus mounting member 20, a pair of retaining members 30, and having an adhesive layer on a back side 28 so as to be selectively coupled to an electronic device 8 and to selectively retain a stylus 12.

The stylus mounting member 20 includes opposed first 22 and second ends 24 and has opposed sides extending therebetween. Preferably, the stylus mounting member 20 has an elongate and linear configuration that is thin and flat. In other words, the stylus mounting member 20 is planar, straight, flat, and includes a front side 26 and a back side 28.

The back side 28 includes an adhesive layer such that the stylus mounting member 20 may be selectively adhered to an outer surface of an electronic device. In an embodiment, a cover 29, such as a plastic sheet, having a configuration substantially the same as that of the stylus mounting member 20, may be initially situated to cover the adhesive layer. The cover 29 effectively prevents the adhesive layer from adhering to any object until the cover 29 is removed and the adhesive layer is pressed and positioned upon an intended surface.

The stick-on stylus holder 10 includes a pair of retaining members 30 although the present invention would be accomplished with only a single retaining member 30 although perhaps not as effective. The pair of retaining members 30 are coupled to the front side 26 of the mounting member 20 and situated proximate the first end 22 and second end 24, respectively. Each retaining member 30 has a generally C-shaped configuration and includes a closed side 32 coupled to the front side 26 of the mounting member 20 and an open side 34 displaced from the front side 26 and opposite the closed side. Specifically, each retaining member 30 may be a C-shaped clip or clamp or similar fastener.

More particularly, each retaining member 30 may be described as having a generally annular, rim-like, or circular configuration except for having the opening. Each retaining member 30 includes opposed side sections 36 extending from the closed side and having terminal ends. The side sections cooperate to define an interior area having a configuration sufficient to receive at least one stylus as will be described later. Further, each terminal end forms a nub 37 that grips or bears against a stylus received within the interior area as will be further described below.

Each retaining member 30 has a flexible resilient and flexible construction that is biased to move/flex so as to increase the open side, i.e. the space between respective terminal ends. For instance, the retaining members 30 may be constructed of a flexible plastic material such that they flex when a stylus 12 having a diameter larger than the space between terminal ends as it is being inserted into the open interior area. Each of the side sections 36 then naturally return to their normal configurations when the pressure of the oversized stylus 12 is removed. The side sections 36, therefore, are normally biased toward a configuration that tightens about a stylus 12 received into the open interior area.

Figure 4:
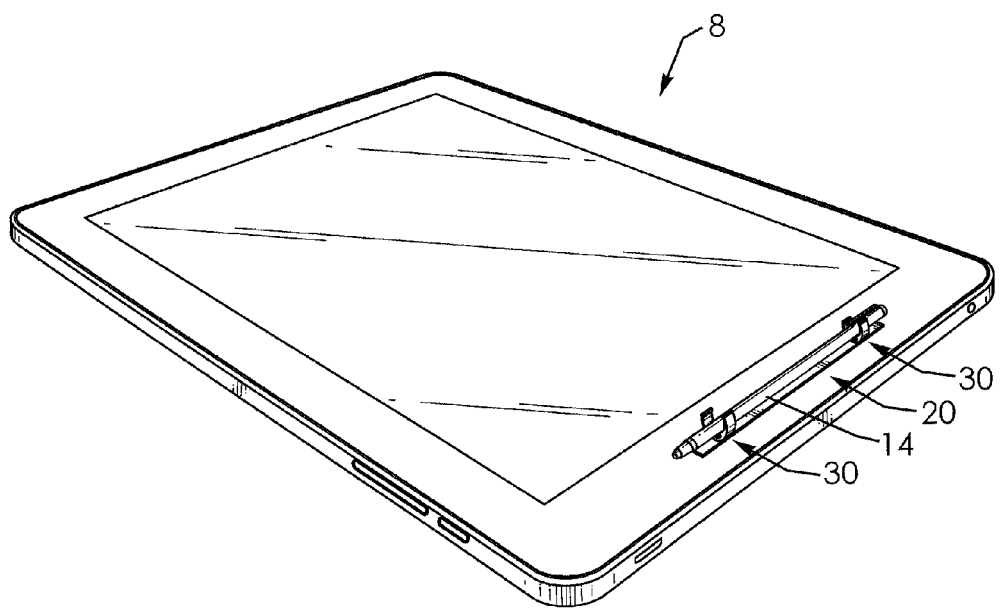
FIG. 4 is a perspective view of the stick-on stylus holder as in FIG. 1A in use on another portable electronic device and with a small diameter stylus.

With further reference to the retaining members 30, each retaining member includes an interior surface proximate the closed end that defines a notch 38. The primary utility of the notch 38 is that it is configured to receive and secure the side or diameter of a smaller diameter stylus 14 (FIG. 4). In other words, the side sections 36 are specifically configured to receive a larger diameter stylus 12 whereas the notch 38 is configured to receive a smaller diameter stylus 14. A secondary utility of the notch 38 is that it increases the flexibility of the side sections 36 to open wider when a larger diameter stylus 12 is being inserted between the terminal ends. The notch 38 may have a general rectangular configuration although a more frusto-circular or rounded configuration would also work.

Described another way, the interior space defined by the side sections 36 of a retaining member 30 may be referred to as a primary receiving area 40 in that it defines a first imaginary diameter that is substantially the same as a diameter of a first larger-diameter stylus 12 (i.e. the stylus described above and shown in FIGS. 1A to 3. The primary receiving area 40 is in communication with the opening between the terminal ends of the side sections 36 of a retaining member 30. In an embodiment, the notch 38 described above may be referred to as an auxiliary receiving area 42 in that it defines a second imaginary diameter that is substantially the same as a diameter of a second smaller-diameter stylus, such as shown in FIG. 4). The auxiliary receiving area 42 is adjacent the closed side 32 of the retaining member 30 and is in communication with the primary receiving area 40. The diameter of the auxiliary receiving area is smaller than that of the primary receiving area 40. Together, the primary and auxiliary receiving areas allow a first stylus (having a "large diameter") and a second stylus (having a "small diameter") to be received simultaneously. It is understood that the terms "large diameter" and "small diameter" are relative and not specific references to diameter but are understood with regard to the accompanying drawings.

In use, the stick-on stylus holder 10 may be coupled to a portable electronic device 8, such as a tablet computer, smart phone, personal digital assistant ("PDA"), so as to be available to navigate a touch screen interface. Specifically, the cover 29 may be removed from the cover 29 of the adhesive layer on the back side 28 of the stylus mounting member 20 and the back side 28 may be pressed onto a desired surface as described above. Then, a stylus 12 may be pressed through the open side 34 of the pair of retaining members 30 and received into the interior area defined thereby. The stylus is held in a friction fit arrangement and may be dislodged by a gentle outward urging by a user, such as for use as an input device to a portable electronic device.

It is understood that while certain forms of this invention have been illustrated and described, it is not limited thereto except insofar as such limitations are included in the following claims and allowable functional equivalents thereof.

The invention claimed is:

1. A stick-on stylus holder for receiving a stylus associated with an electronic device, comprising:
 a stylus mounting member having opposed first and second ends and having opposed front and rear sides extending therebetween, said stylus mounting member having an elongate and linear configuration; and
 a pair of retaining members mounted to a front side of said stylus mounting member proximate said first and second ends, respectively, each retaining member having a generally circular configuration that defines an open interior area;
 wherein:
  each retaining member has a closed side coupled to said front side of said stylus mounting member and an open side facing away from said front side that is in communication with said open interior area and configured to selectively receive the stylus;
  said back side of said stylus mounting member includes an adhesive layer configured to adhere to an electronic device;
  each retaining member has a flexible and resilient configuration that is biased to flexibly increase said open side upon insertion of the stylus, said open side being biased to return to an unbiased configuration;
  each retaining member is a C-shaped clip having opposed resilient side sections normally biased toward a tightened configuration that grips the stylus when received in said open interior area;
  each retaining member includes an interior surface that defines a notch adjacent said closed end that selectively receives a small diameter stylus in a friction fit engagement.

2. The stick-on stylus holder as in claim 1, wherein each side section includes a terminal end having a nub configured to bear against the stylus when received in said open interior area.

3. The stick-on stylus holder as in claim 2, comprising a cover removably situated over said adhesive layer of said back side of said stylus mounting member, said cover revealing said adhesive layer when removed.

4. The stick-on stylus holder as in claim 1, comprising a cover removably situated over said adhesive layer of said back side of said stylus mounting member, said cover revealing said adhesive layer when removed.

5. The stick-on stylus holder as in claim 1, comprising a cover removably situated over said adhesive layer of said back side of said stylus mounting member, said cover revealing said adhesive layer when removed.

6. A stick-on stylus holder for receiving a stylus associated with an electronic device, comprising:
 a stylus mounting member having opposed first and second ends and having opposed front and rear sides extending therebetween, said stylus mounting member having an elongate and linear configuration; and a pair of retaining members mounted to a front side of said stylus mounting member proximate said first and second ends, respectively, each retaining member having a generally circular configuration that defines an open interior area;

wherein each retaining member has a closed side coupled to said front side of said stylus mounting member and an open side facing away from said front side that is in communication with said open interior area and configured to selectively receive the stylus;

wherein said back side of said stylus mounting member includes an adhesive layer configured to adhere to an electronic device;

wherein said interior area includes a primary receiving area dimensioned to receive a large diameter stylus and an auxiliary receiving area dimensioned to receive a small diameter stylus.

7. The stick-on stylus holder as in claim 6 wherein:

said primary receiving area is in communication with said open side of said retaining member and defines a first diameter substantially similar to a diameter of a first stylus having a large diameter; and said auxiliary receiving area is in communication with said primary receiving area and defines a second diameter substantially similar to a diameter of a second stylus having a small diameter.

8. A stick-on stylus holder for receiving a stylus associated with an electronic device, comprising:

a stylus mounting member having opposed first and second ends and a defining a thin and elongate configuration therebetween;

a pair of retaining members mounted to a front side of said stylus mounting member proximate said first and second ends, respectively, each retaining member having a generally C-shaped configuration that defines an open interior area;

wherein each retaining member has a an open side facing away from said stylus mounting member that is in communication with said open interior area and configured to selectively receive the stylus;

wherein said interior area includes a primary receiving area dimensioned to receive a large diameter stylus and an auxiliary receiving area dimensioned to receive a small diameter stylus.

9. The stick-on stylus holder as in claim 8, wherein each retaining member has a flexible and resilient configuration that is biased to flexibly increase a size of said open side upon insertion of the stylus, said open side being biased to return to an unbiased configuration.

10. The stick-on stylus holder as in claim 9, wherein each retaining member is a C-shaped clamp having opposed side sections normally biased toward a tightened configuration that grips the stylus situated in said open interior area, each side section having a terminal end forming a nub configured to bear against the stylus when received in said open interior area.

11. The stick-on stylus holder as in claim 8, wherein:

said primary receiving area is in communication with said open side of said retaining member and defines a first diameter substantially similar to a diameter of a first stylus having a large diameter; and said auxiliary receiving area is in communication with said primary receiving area and defines a second diameter substantially similar to a diameter of a second stylus having a small diameter.

12. The stick-on stylus holder as in claim 11, wherein said interior area of each retaining member is configured to receive said first stylus in said primary receiving area and said second stylus in said second receiving area simultaneously.

13. The stick-on stylus holder as in claim 8, comprising a cover removably situated over said adhesive layer of said back side of said stylus mounting member, said cover revealing said adhesive layer when removed.

* * * * *